United States Patent [19]

Mizutani

[11] Patent Number: 4,622,186
[45] Date of Patent: Nov. 11, 1986

[54] PROCESS FOR PREPARATION SINTERED SILICON NITRIDE BODY HAVING SURFACE COMPRESSION STRESS

[75] Inventor: Michitaka Mizutani, Tsu, Japan

[73] Assignee: Kyocera Corporation, Kyoto, Japan

[21] Appl. No.: 708,090

[22] Filed: Mar. 5, 1985

[30] Foreign Application Priority Data

Mar. 6, 1984 [JP] Japan .................. 59-43576

[51] Int. Cl.$^4$ .............................. C04B 35/58
[52] U.S. Cl. .................... 264/62; 264/570; 428/698
[58] Field of Search ................. 264/62, 570

[56] References Cited

U.S. PATENT DOCUMENTS 3,819,787  6/1974  Coe ............................. 264/332
4,310,477  1/1982  Uy et al. ....................... 264/62

Primary Examiner—James Derrington
Attorney, Agent, or Firm—Spensley Horn Jubas & Lubitz

[57] ABSTRACT

In preparing a sintered silicon nitride body by hot isostatic pressing, a composition comprising $Si_3N_4$ and a sintering aid is molded to form a green molded body, the surface of the green molded body is coated with a composition comprising $Si_3N_4$ and a sintering aid and having a sintering temperature lower than that of the composition of the green molded body, the coated green molded body is preliminarily sintered so that only the coating layer is densified, and the preliminarily sintered molded body is subjected to hot isostatic pressing. The obtained sintered body has a surface compression stress, and by this surface compression stress, not only the strength at room temperature but also the strength at high temperatures is improved.

8 Claims, No Drawings

PROCESS FOR PREPARATION SINTERED SILICON NITRIDE BODY HAVING SURFACE COMPRESSION STRESS

BACKGROUND OF THE INVENTION

1. Field of the Invention

The present invention relates to a process for the preparation of a sintered silicon nitride body having a surface compression strength and hence, being excellent in the strength at high temperatures. More particularly, the present invention relates to a process for preparing a sintered silicon nitride body having an improved surface texture by hot isostatic pressing. Furthermore, the present invention relates to a novel sintered silicon nitride body prepared according to this process.

2. Description of the Prior Art

Recently, the HIP process (hot isostatic pressing sintering process) has attracted attention as means for sintering a ceramic material to densify the ceramic material with use of a small amount of a sintering aid, and various treating techniques utilizing this HIP process have been developed. Especially for obtaining a sintereed boby having a complicate shape from a molded powder, there is mainly adopted a so-called glass capsule process in which a powder, a green molded body or a pre-sintered body is filled in a glass (Vycor or Pyrex) vessel and is preliminarily sintered under compression by an inert gas at a temperature close to the softening point of the glass vessel to cover the periphery of the compressed body with the glass, the interior powder, green molded body or pre-sintered body is densified in a high-temperature high-pressure gas by using the covering glass layer as a pressure-transmitting medium, and the intended sintered body is obtained by removing the glass from the periphery of the formed sintered body by using a dissolving solution or according to the sand blasting method.

This process, however, is defective in that since a large quantity of the softened glass component intrudes in the grain boundary phase in the sintered body, the strength at high temperatures is drastically reduced.

SUMMARY OF THE INVENTION

It is a primary object of the present invention to provide a sintered silicon nitride body having an improved surface texture and a surface compression stress and hence, being excellent in not only the strength at room temperature but also the strength at high temperatures according to the HIP process and a process for preparing this sintered body.

Another object of the present invention is to provide a process for the preparation of a sintered silicon nitride body having an improved texture as a whole and having a surface compression stress by forming, by preliminary sintering, a silicon nitride skin layer having a low-temperature sintering property on the surface of a silicon nitride core and utilizing this skin layer as a pressure transmitting medium at the HIP treatment.

Still another object of the present invention is to provide a sintered silicon nitride body in which the surface of the sintered body has a surface compression exceeding a certain critical level and hence, the strength at high temperatures is prominently improved.

In accordance with one fundamental aspect of the present invention, there is provided a process for the preparation of a sintered silicon nitride body, which comprises the steps of (i) molding a first composition comprising silicon nitride and, if necessary, a sintering aid into a predetermined shape to form a green molded body, (ii) coating the green molded body obtained at the step (i) with a slurry of a second composition comprising silicon nitride and a sintering aid and having a sintering temperature lower than that of the first composition, (iii) preliminarily sintering the coated molded body obtained at the step (ii) in an inert atmosphere under such a temperature condition that only the coating of the second composition is densified but the interior portion composed of the first composition is not densified, and (iv) subjecting the preliminarily sintered body obtained at the step (ii) to hot isostatic pressing in an inert atmosphere under such temperature and pressure conditions that the interior portion composed of the first composition is densified.

In accordance with another fundamental aspect of the present invention, there is provided a sintered silicon nitride body formed by sintering of a silicon nitride powder containing a sintering aid according to need, said sintered body comprising (i) a core formed by sintering of a silicon nitride powder containing a sintering aid according to need and (ii) a shell formed by sintering of a silicon nitride powder containing a sintering aid and having a sintering temperature lower than that of the core, wherein said sintered body has a surface compression stress of at least 1 kg/mm$^2$ as determined by the X-ray stress measuring method.

DETAILED DESCRIPTION OF THE PREFERRED EMBODIMENTS

In the instant specification, the sintering temperature is defined as follows.

When the ratio of the density of a sintered body to the theoretical density is plotted on the ordinate and a temperature at which a molded ceramic body is maintained for a certain time for effecting sintering is plotted on the abscissa, there is ordinarily obtained a curve in which the density ratio is increased with elevation of the temperature and the density ratio is gradually brought close to 100%. With respect to a ceramic material having a certain composition, the temperature at which the above-mentioned density ratio is 95% can be determined from this curve. In the instant specification and appended claims, this temperature is referred to as "sintering temperature".

The present invention is based on the finding that if the peripheral surface of a molded body composed of a silicon nitride composition is coated with a slurry composed of a silicon nitride composition having a sintering temperature lower than that of the composition of the molded body and the coated molded body is subjected to preliminary sintering and then to a HIP treatment, there is obtained a sintered body which is much excellent in the strength at high temperatures over sintered bodies obtained according to the conventional HIP method.

More specifically, according to the present invention, by using a silicon nitride composition having a low temperature-sintering property as a composition to be coated on the peripheral surface of a molded body composed of a silicon nitride composition, the outer coating layer is first densified at the sintering step, and the HIP treatment is carried out by using the coating layer formed on the molded body as a pressure transmitting medium (instead of the glass capsule in the conventional technique). Therefore, the outer coating layer is first sintered and the interior portion is then sintered, and hence, the interior portion is contracted relatively to the sintered and densified outer layer, with the result that a surface compression stress is produced in the outer layer of the formed sintered body.

When a slurry comprising silicon nitride and at least one oxide and/or nitride (hereinafter referred to as "nitride/oxide") of an element of the group IIIa of the Periodic Table, Al, Ti or Cr is coated on the peripheral surface of a molded body of silicon nitride and the molded body is subjected to a HIP treatment, the sintering aid intrudes into the grain boundary phase of the interior portion from the surface of the molded body of silicon nitride and attainment of promoting sintering of the molded body is expected. In case of HIP sintering according to the conventional glass capsule method, a large quantity of the glass component degrading the strength at high temperatures intrudes into the grain boundary phase of the surface of the molded body of a silicon nitride composition. On the other hand, in the present invention, the sintering aid promoting sintering of silicon nitride intrudes in the grain boundary phase of the surface of the molded body of the silicon nitride composition, whereby not only the flexural strength at normal temperatures but also the flexural strength at high temperatures is prominently improved. In the present invention, it is indispensable that the surface compression stress of the sintered body should be at least 1 kg/mm$^2$. If this requirement is not satisfied, the strength at normal temperatures and the strength at high temperatures are not different from those attained in the conventional glass capsule method, and no improvement of the strength characteristics can be attained.

In the present invention, $Si_3N_4$ having an $\alpha$-type or $\beta$-type crystal structure is used as the silicon nitride. At least one member selected from oxides and nitrides of elements of the group IIIa of the Periodic Table (rare earth elements), alumina, aluminum nitride, titania, titanium nitride, chromium oxide ($Cr_2O_3$), beryllia and magnesia is used as the sintering aid. Incorporation of the sintering aid is not indispensably necessary, but it is preferred that the sintering aid be incorporated in an amount of up to 50% by weight, especially up to 10% by weight, paritcularly especially up to 5% by weight, based on $Si_3N_4$.

Molding of the above composition is accomplished after incorporation of a binder such as a wax by known molding means such as compression molding, injection molding or cold isostatic pressing.

According to the present invention, a composition comprising silicon nitride and a sintering aid and having a sintering temperature lower than that of the composition of the molded body is coated in the form of a paste or a slurry on the so-formed green molded body. The sintering temperature of the composition depends first on the presence or absence of the sintering aid and the kind of the sintering aid, second on the amount incorporated of the sintering aid and third on the particle size of $Si_3N_4$ used. If the sintering aid is incorporated, the sintering temperature should naturally be lower than that of $Si_3N_4$ free of the sintering aid. When different sintering aids are used in the same amount, the sintering temperature of the composition is influenced by the kind of the sintering aid. More specifically, the sintering temperature becomes lower in the order of nitrides $>M_2O_3$ (M is an element of group IIIa of periodic table) $>M_2O_{3+Al_2O_3}>BeO+Al_2O_3>TiO_2>MgO$. Furthermore, increase of the amount incorporated of the sintering aid ordinarily results in lowering of the sintering temperature. Moreover, as the particle size of starting $Si_3N_4$ is reduced, the sintering temperature of the composition is lowered.

In the present invention, as pointed out hereinbefore, by adjusting the kind and amount of the sintering aid and the combination thereof in the second composition for the coating layer and, if necessary, adjusting the particle size of starting $Si_3N_4$, the sintering temperature of the composition for the coating layer is made lower, especially by 40° to 200° C. lower, than the sintering temperature of the composition for the molded body. Specific compositions satisfying this condition will become apparent from the Example given hereinafter. It is preferred that the composition for the coating layer should contain 5 to 20% by weight based on the total composition and the content of the sintering aid in the composition for the coating layer be higher by at least 1% by weight, especially by at least 3% by weight, than the content of the sintering aid in the composition for the molded body.

The formed composition is wet-pulverized in a liquid medium such as water to form a coating slurry. It is preferred that the solid content in the coating slurry be 50 to 80% by weight.

Coating of the green molded body with the above-mentioned slurry is accomplished by customary means such as dipping, coating or spraying.

It is preferred that the amount, as solids, of the coating layer of the slurry be 0.1 to 0.5 part by weight, especially 0.1 to 0.3 part by weight, per part by weight of the $Si_3N_4$ green molded body. If the amount of the coating layer is smaller than 0.01 part by weight, the thickness of the above-mentioned second composition layer intruding into the surface of $Si_3N_4$ of the green molded body is very small or this second composition layer is not formed and attainment of the covering effect (the interior-sealing effect) at the HIP treatment cannot be expected, with the result that the inner molded body is directly exposed to the nitrogen pressure and the treatment is not different from the ordinary gas pressure sintering treatment, and the flexural strength is not improved. If the amount of the coating layer is larger than 0.5 part by weight, the amount of the inner $Si_3N_4$ green molded body is too small, and the above-mentioned difference of contraction by sintering is not brought about and no sufficient surface compression stress can be obtained. Moreover, since the entire composition of the molded body is greatly deviated, the desired strength at high temperatures cannot be obtained.

The coated green molded body is dried according to need, and it is then subjected to preliminary sintering in an inert atmosphere under normal pressure, elevated pressure or reduced pressure. This preliminary sintering is carried out under such a temperature condition that only the coating layer of the second composition is densified but the interior portion of the first composition is not densified. If the difference of the sintering temperature between the two compositions is 40° to 200° C., this preliminary sintering can be easily accomplished. It is preferred that this preliminary sintering be carried out at a temperature of 1500 to 1800° C., which is higher than the sintering temperature of the second composition, for 0.5 to 5 hours.

Hot isostatic pressing is accomplished by fillng the preliminarily sintered coated molded body in an apparatus comprising a pressure cylinder and top and end closures and having in the interior thereof an insulator mantle, a support and a heating element arranged on the inner side of the insulator mantle, and heating the molded body while feeding an inert gas under pressure into the apparatus. Generally, pressurization to 1500 to 2000 atmospheres (gauge) and heating to a temperature of 1500° to 2000° C., which is higher than the sintering temperature of the first composition, are effective for this hot isostatic pressing. A nitrogen gas is advantageously used as the inert gas, but argon or the like may be used.

The sintered body obtained by the HIP treatment is polished, and a final product is thus obtained.

The sintered silicon nitride body of the present invention is characterized in that on the surface of a core formed by sintering of a silicon nitride powder containing a sintering aid according to need, there is formed a shell by sintering of a silicon nitride powder containing a sintering aid, which has a sintering temperature lower than that of the core. Even if the sintering aid contained in the shell intrudes into the core, this sintering aid has no bad influences on the physical properties of the core, though the sintering aid promotes sintering of the core.

Furthermore, in the present invention, since the above-mentioned dense skin layer is formed at the HIP treatment and the dense sintered core is formed while utilizing this skin layer as the pressure-transmitting medium, the sintered silicon nitride body is charcterized in that the surface compression stress is produced in the skin layer and the flexural strength of the sintered body is prominently improved. Moreover, in this skin layer, no low-melting point glass is present in the crystal grain boundary phase and a surface compression stress is produced, and therefore, the above-mentioned excellent flexural strength is maintained even at room temperature and high temperatures.

The presence of the surface compression stress in the surface of the sintered body and the amplitude of this stress can be determined by measuring the crystal strain due to the stress according to the X-ray diffractometry.

More specifically, if the lattice spacing d of the crystal is changed by $\Delta d$, the X-ray diffraction angle $\theta$ is changed by $\Delta\theta$. Since this change $\Delta\theta$ of the diffraction angle cannot be directly known diffraction angles $2\theta$ of several incident angels $\phi$ are determined and plotted relatively to $\sin^2\phi$, and the gradient $\partial 2\theta/\partial \sin^2 \phi(\tan \alpha)$ is determined. The residual stress (kg/mm$^2$) is calculated according to the following formula:

$$\delta = -\frac{E}{2(1+\nu)} \cdot \cot\theta \cdot \frac{\partial 2\theta}{\partial \sin^2\psi}$$

wherein E stands for the elastic constant (kg/mm$^2$) and $\nu$ stands for Poisson's ratio The present invention will now be described in detail with reference to the following example that by no means limits the scope of the invention.

EXAMPLE

A powdery composition for an interior silicon nitride molded body, comprising $Si_3N_4$ and an oxide/nitride of an element of the group IIIa of the Periodic Table or Al, shown in Table 1, as a sintering aid, was wet-blended and wet-pulverized for 72 hours in a ball mill. The obtained slurry was dried, granulated and press-molded, and the binder used for molding was removed in vacuo. Thus, interior silicon nitride molded bodies of samples Nos. 1 through 12 shown in Table 1 were prepared.

A powdery composition for an outer layer, comprising $Si_3N_4$ and an oxide/nitride of an element of the group IIIa of the Periodic Table, Al, Ti or Cr, shown in Table 1, as a sintering aid, was wet-blended and wet-pulverized for 72 hours in a ball mill. Thus, outer layer compositions of samples Nos. 1 through 9 were prepared.

The difference of the sintering temperature between the interior compositions and the outer layer compositions was in the range of from 50° to 200° C. The outer layer slurries of samples Nos. 1 through 9 were coated on the peripheries of the interior silicon nitride molded bodies of samples Nos. 1 through 9, respectively. The amount coated of the slurries was 10% by weight based on the molded bodies.

Each of the coated molded bodies was sintered under preliminary sintering and HIP treatment conditions shown in Table 2. Thus, sintered bodies of samples Nos. 1 through 9 were obtained.

The peripheries of the interior silicon nitride molded bodies of samples Nos. 10 through 12 were coated with Vycor, and the coated molded bodies were sintered under preliminary sintering and HIP treatment conditions shown in Table 2 to obtain sintered bodies of samples Nos. 10 through 12 as comparative examples.

With respect to each of samples Nos. 1 through 12, the flexural strength at room temperature and the flexural strength at 1300° C. were measured, and the surface compression stress of the sintered body was determined according to the X-ray stress measuring method. The obtained results are shown in Table 2.

TABLE 1

| Sample No. | Outlayer Composition (% by weight) | | | | | Sintering Temperature (°C.) | Interior Molded Body Composition (% by weight) | | | Sintering Temperature (°C.) | Difference (°C.) of Sintering Temperature |
|---|---|---|---|---|---|---|---|---|---|---|---|
| | $Si_3N_4$ | Group IIIa | Al | Ti | Cr | | $Si_3N_4$ | Group IIIa | Al | | |
| 1 | 92 | $Y_2O_3$, 3 | $Al_2O_3$, 5 | — | — | 1750 | 95 | $Y_2O_3$, 3 | $Al_2O_3$, 2 | 1850 | 100 |
| 2 | 95 | $La_2O_3$, 2 | $Al_2O_3$, 3 | — | — | 1800 | 95 | $La_2O_3$, 2.5 $Y_2O_3$, 2.5 | — | 1900 | 100 |
| 3 | 90 | $Y_2O_3$, 7 | $Al_2O_3$, 3 | — | — | 1750 | 95 | $Y_2O_3$, 3 | $Al_2O_3$, 2 | 1850 | 100 |
| 4 | 85 | $La_2O_3$, 10 $Y_2O_3$, 5 | — | — | — | 1700 | 90 | $Y_2O_3$, 5 | $Al_2O_3$, 5 | 1750 | 50 |
| 5 | 90 | $Sm_2O_3$, 5 | — | $TiO_2$, 3 | $Cr_2O_3$, 2 | 1750 | 95 | $Ce_2O_3$, 3 | AlN, 2 | 1850 | 100 |
| 6 | 90 | $Ce_2O_3$, 1 | $Al_2O_3$, 5 | $TiO_2$, 1 | $Cr_2O_3$, 3 | 1650 | 92 | $La_2O_3$, 4 $Sm_2O_3$, 2 $Yb_2O_3$, 2 | — | 1700 | 50 |
| 7 | 90 | YN 5 | AlN, 5 | — | — | 1650 | 92 | $La_2O_3$, 4 | — | 1700 | 50 |

TABLE 1-continued

| Sample No. | Group Si$_3$N$_4$ | IIIa | Outlayer Composition (% by weight) Al | Ti | Cr | Sintering Temperature (°C.) | Interior Molded Body Composition (% by weight) Si$_3$N$_4$ | Group IIIa | Al | Sintering Temperature (°C.) | Difference (°C.) of Sintering Temperature |
|---|---|---|---|---|---|---|---|---|---|---|---|
| 8 | 90 | YN, 1 Y$_2$O$_3$, 3 | AlN, 3 | TiN, 3 | — | 1700 | 95 | Sm$_2$O$_3$, 2 Yb$_2$O$_3$, 2 Yb$_2$O$_3$, 3 | Al$_2$O$_3$, 2 | 1850 | 150 |
| 9 | 80 | La$_2$O$_3$, 5 Sm$_2$O$_3$, 5 | AlN, 3 | TiN, 3 | Cr$_2$O$_3$, 4 | 1600 | 95 | Nd$_2$O$_3$, 3 | Al$_2$O$_3$, 2 | 1800 | 200 |
| 10 | Vycor | | | | | — | 95 | Y$_2$O$_3$, 3 | Al$_2$O$_3$, 2 | 1850 | — |
| 11 | Vycor | | | | | — | 95 | Y$_2$O$_3$, 3 | Al$_2$O$_3$, 2 | 1850 | — |
| 12 | Vycor | | | | | — | 95 | Y$_2$O$_3$, 3 | Al$_2$O$_3$, 2 | 1850 | — |
| 1a | 92 | Y$_2$O$_3$ 3 | Al$_2$O$_3$ 5 | — | — | 1750 | 100 | — | — | — | — |

TABLE 2

| Sample No. | Preliminary Sintering (in N$_2$ atmosphere) Pressure (Kg/cm$^2$) | Sintering Temperature (°C.) | Sintering Time (hours) | Pressure (kg/cm$^2$) | Sintering Temperature (°C.) | Sintering Time (hours) | Bulk Specific Gravity | Room Temperature Strength (kg/cm$^2$) b4 (RI) | High Temperature Strength (kg/cm$^2$) b4 (1300° C.) | Compression Stress (kg/mm$^2$) |
|---|---|---|---|---|---|---|---|---|---|---|
| 1 | 1 | 1750 | 3 | 2000 | 1700 | 1 | 3.23 | 109 | 63 | 10 |
| 2 | 9.8 | 1800 | 3 | 2000 | 1850 | 1 | 3.21 | 115 | 59 | 7 |
| 3 | 9.8 | 1800 | 2 | 2000 | 1850 | 1 | 3.27 | 112 | 48 | 5 |
| 4 | 1 | 1800 | 5 | 2000 | 1800 | 3 | 3.41 | 98 | 52 | 6 |
| 5 | 1 | 1750 | 3 | 2000 | 1800 | 1 | 3.33 | 95 | 39 | 13 |
| 6 | 9.8 | 1800 | 1 | 2000 | 1850 | 1 | 3.44 | 98 | 43 | 11 |
| 7 | 9.8 | 1800 | 3 | 2000 | 1800 | 1 | 3.38 | 105 | 55 | 10 |
| 8 | 9.8 | 1750 | 3 | 2000 | 1850 | 1 | 3.27 | 103 | 47 | 8 |
| 9 | 9.8 | 1700 | 5 | 2000 | 1800 | 1 | 3.48 | 96 | 51 | 13 |
| 10 | 1 | 800 | 3 | 2000 | 1700 | 1 | 3.20 | 69 | 3 | <1 |
| 11 | 1 | 800 | 3 | 2000 | 1950 | 1 | 3.24 | 55 | 2 | <1 |
| 12 | 1 | 800 | 3 | 2000 | 1450 | 1 | 2.91 | 45 | 8 | <1 |
| 1a | 1 | 1700 | 3 | 2000 | 1980 | 1 | 3.21 | 97 | 73 | 11 |

Each of samples Nos. 1 through 9 having a double structure comprising an interior silicon nitride composition and an outer layer of a silicon nitride composition having a sintering temperature lower than that of the interior composition has a room temperature flexural strength of at least 95 kg/mm$^2$ and a flexural strength of at least 39 kg/mm$^2$ at 1300° C., and a surface compression stress of at least 5 kg/mm$^2$. Especially, sample No. 1 is excellent because the room temperature flexural strength is 109 kg/mm$^2$ and the flexural strength at 1300° C. is 63 kg/mm$^2$.

In contrast, in samples Nos. 10 through 12 obtained by coating an interior silicon nitride composition with Vycor and subjecting the coated composition to preliminary sintering and HIP treatments, the room temperature flexural strength is lower than 69 kg/mm$^2$, the flexural strength at 1300° C. is lower than 8 kg/mm$^2$ and the surface compression stress is lower than 1 kg/mm$^2$. Especially, samples Nos. 10 and 11 are inferior because the flexural strengths at 1300° C. are 2 and 3 kg/mm$^2$, respectively.

Incidentally, it is preferred that the difference of the sintering temperature between the core and shell be 40° to 200° C. If this difference is smaller than 40° C., it is apprehended that both the core and shell will be simultaneously sintered, and generation of the compression stress owing to the difference of contraction cannot be expected and no densifying effect by the HIP treatment can be attained. If the above-mentioned difference of the sintering temperature is larger than 200° C., decomposition of the shell becomes vigorous at the temperature where sintering of the core is effected, and hence, the desired strength at high temperatures cannot be obtained.

I claim:

1. A process for making a sintered silicon nitride body, comprising the steps of:
    i. molding a first composition comprising silicon nitride and a sintering aid into a predetermined shape to form a green molded body;
    ii. coating the green molded body obtained in step (i) with a slurry of a second composition comprising silicon nitride and a sintering aid, the sintering temperature of said second composition being 40° C. to 200° C. lower than that of the first composition;
    iii. after step (ii), preliminarily sintering the coated molded body in an inert atmosphere at a temperature such that only the coating of the second composition is densified but the molded green body composed of the first composition is not densified; and
    iv. after step (iii), subjecting the preliminarily sintered body to hot isostatic pressing in an inert atmosphere under temperature and pressure conditions which densify the molded body composed of the first composition.

2. The process of claim 1, wherein the second composition contains the sintering aid in an amount which is 5 to 20 percent by weight of the entire second composition and at least 3 percent by weight more than the percent of sintering aid in the first composition.

3. The process of claim 1, wherein the sintering aid is selected from the group consisting of oxides and nitrides of elements of Group IIIa of the periodic table, alumina, aluminum nitride, titania, titanium nitride, chromium oxide, beryllia and magnesia.

4. The process of claim 1, wherein the slurry of the second composition has a solids concentration of 50 to 80 percent by weight.

5. The process of claim 1, wherein the coating of the second composition is present in an amount of 0.01 to 0.5 part by weight per part by weight of the green molded body of the first composition.

6. The process of claim 1, wherein the preliminary sintering is carried out at a temperature in the range of 1500° to 1800° C., said temperature being at least as high as the sintering temperature of the second composition but lower than the sintering temperature of the first composition.

7. The process of claim 6, wherein the preliminary sintering step is conducted for 0.5 to 5 hours.

8. The process of claim 1, wherein the hot isostatic pressing step is conducted under a pressure of 1500 to 2000 atmosheres (gauge) and at a temperature in the range of 1500° to 2000° C., said temperature being at least as high as the sintering temperature of the first composition.

* * * * *